(12) United States Patent
Cheng et al.

(10) Patent No.: US 9,609,079 B1
(45) Date of Patent: Mar. 28, 2017

(54) METHODS FOR IMPROVED CACHE MAINTENANCE AND DEVICES THEREOF

(71) Applicant: F5 Networks, Inc., Seattle, WA (US)

(72) Inventors: Liang Cheng, San Jose, CA (US); Eswar Balasubramanian, Kirkland, WA (US); Shawn Hurley, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 250 days.

(21) Appl. No.: 14/567,041

(22) Filed: Dec. 11, 2014

Related U.S. Application Data

(60) Provisional application No. 61/915,139, filed on Dec. 12, 2013.

(51) Int. Cl.
  *G06F 12/02* (2006.01)
  *H04L 29/08* (2006.01)
  *H04L 12/801* (2013.01)
  *G06F 17/30* (2006.01)

(52) U.S. Cl.
  CPC .... *H04L 67/2842* (2013.01); *G06F 17/30053* (2013.01); *H04L 47/29* (2013.01); *H04L 67/146* (2013.01)

(58) Field of Classification Search
  CPC ... H04L 67/2842; H04L 47/29; H04L 67/146; G06F 17/30053
  See application file for complete search history.

(56) References Cited

U.S. PATENT DOCUMENTS

| | | | | |
|---|---|---|---|---|
| 2002/0087975 A1* | 7/2002 | Schlack | ................ | H04H 20/10 725/34 |
| 2006/0175767 A1* | 8/2006 | Collins | ................ | E06B 3/6612 277/644 |
| 2010/0268836 A1* | 10/2010 | Jabri | ...................... | H04L 47/38 709/231 |
| 2013/0174271 A1* | 7/2013 | Handal | ............. | G06F 17/30017 726/27 |
| 2013/0212292 A1* | 8/2013 | Jennings | ................ | H04N 7/165 709/231 |
| 2013/0218650 A1* | 8/2013 | Jennings | ................ | H04N 7/165 705/14.7 |
| 2013/0218672 A1* | 8/2013 | Jennings | ................ | H04N 7/165 705/14.49 |

(Continued)

*Primary Examiner* — Philip Chea
*Assistant Examiner* — Wuji Chen
(74) *Attorney, Agent, or Firm* — LeClairRyan, a Professional Corporation

(57) ABSTRACT

A method, non-transitory computer readable medium, and application acceleration management (AAM) computing device that modifies an obtained master playlist file such that a first set of meta information is appended to a network address of a secondary playlist file. The secondary playlist file is obtained and modified such that the first and second sets of meta information are appended to a network address of a media file. Alternatively to modifying the playlist files, first and second cookies including the first set of meta information and the first and second sets of meta information, respectively, can be used. A cache score is generated for the media file based on the first and second sets of meta information included in a request for the media file. The media file is obtained, stored in a cache as associated with the cache score, and sent in response to the request.

18 Claims, 5 Drawing Sheets

(56) References Cited

U.S. PATENT DOCUMENTS

| | | | |
|---|---|---|---|
| 2013/0219025 A1* | 8/2013 | Jennings | H04N 7/165 709/219 |
| 2013/0219075 A1* | 8/2013 | Jennings | H04N 7/165 709/231 |
| 2013/0219428 A1* | 8/2013 | Jennings | H04N 7/165 725/32 |
| 2014/0223478 A1* | 8/2014 | Ogilvie | H04N 7/15 725/38 |
| 2015/0341405 A1* | 11/2015 | Jennings | H04N 7/165 725/32 |
| 2015/0341409 A1* | 11/2015 | Jennings | H04N 7/165 709/219 |

* cited by examiner

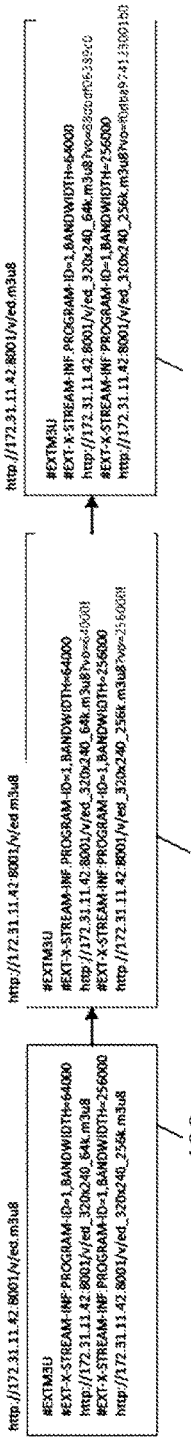
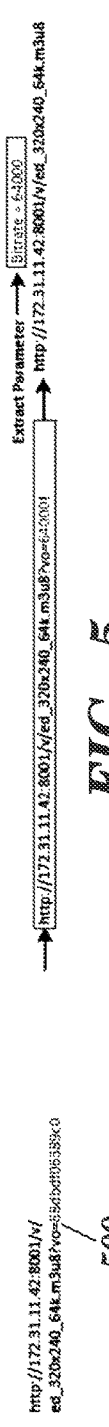
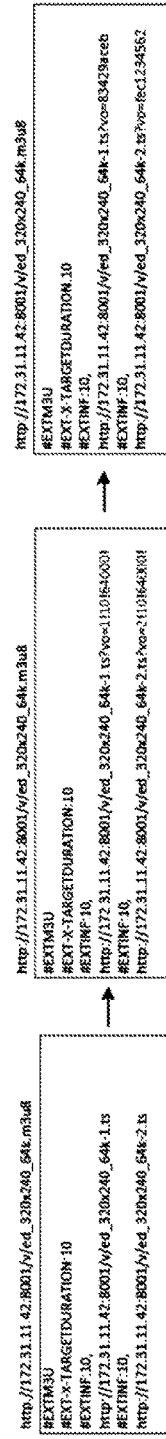
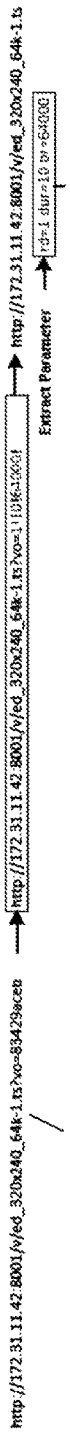
FIG. 4
FIG. 5
FIG. 6
FIG. 7

METHODS FOR IMPROVED CACHE MAINTENANCE AND DEVICES THEREOF

This application claims the benefit of U.S. Provisional Patent Application Ser. No. 61/915,139, filed on Dec. 12, 2013, which is hereby incorporated by reference in its entirety.

FIELD

This technology generally relates to methods and devices for improved cache maintenance and, more specifically, to more efficiently scoring cached media content to improve memory utilization.

BACKGROUND

Application acceleration management (AAM) devices can accelerate and optimize network traffic communicated between server devices and client devices in order to improve the user experience. AAM computing devices can perform other functions on the network traffic, such as load balancing the network traffic to the server devices and/or implementing firewalls or other security measures on behalf of the network, for example. In order to improve the service of requests for content received from client devices, AAM computing devices often implement a cache to locally store requested content retrieved from server devices to be retrieved more quickly in response to subsequent requests for the content.

However, memory utilized for a cache can be expensive and is limited in size. Accordingly, content is frequently removed from the cache to make room for content more likely to be requested by client devices in future requests in order to optimize the use of the cache. One method of maintaining a cache and identifying content to be removed is by generating a cache score associated with the content. The cache score can be based on any number of factors, criteria, attributes, and/or characteristics of the content.

One exemplary use of a cache is to store media files, such as video segments. Video segments are retrieved using hierarchically structured playlists according to an HTTP Adaptive BitRate (ABR) streaming protocol, such as Apple Inc.'s HTTP Live Streaming (HLS), whereby a master playlist file stores network addresses of a secondary playlist file, which stores network addresses of the video segments. A master playlist file can include network addresses of a plurality of secondary playlist files, each associated with a different bit rate in the master playlist file. Accordingly, upon receipt of the master playlist file, an application, such as a video player, executing on a client device can decide which bit rate is currently most appropriate, or will result in the best experience for the user, and request one of the secondary playlist files using the corresponding network address indicated in the master playlist file.

Upon receipt of the secondary playlist file, the application executing on the client device can cause the client device to request video segments corresponding to the bit rate associated with the secondary playlist file, using the network addresses indicated in the secondary playlist file. The video segments can then be retrieved by the AAM computing device and stored in the cache. However, the AAM computing device will not have any meta information included in the master and secondary playlist files (e.g., bit rate, bandwidth, codec, relative distance, or duration) associated with the video segments from which to generate a cache score.

To address this, AAM computing devices currently store in memory or a database, for example, meta information extracted from the master and secondary playlist files prior to sending those files to the client device. When a video segment is retrieved, the AAM computing device retrieves the stored meta information and generates the cache score. Accordingly, the AAM computing device may require significant memory space to store meta information for media content requested by various client devices, which is undesirable as memory is a limited resource which could otherwise be used to store other information that could be used to improve the functioning of the AAM computing device and/or the associated user experience.

SUMMARY

A method for improved cache maintenance includes receiving by an application acceleration management (AAM) computing device a first request from a client device, wherein the first request is for a master playlist file. The master playlist file is obtained by the AAM computing device and sent to the client device in a response to the first request. The master playlist file is modified prior to being sent such that a first set of meta information is appended to a network address of a secondary playlist file identified in the master playlist file. Alternatively, the response includes a first cookie including the first set of meta information. A second request is received by the AAM computing device from the client device, wherein the second request is for the secondary playlist file and includes the first set of meta information. The secondary playlist file is obtained by the AAM computing device and sent to the client device in another response to the second request. The secondary playlist file is modified prior to being sent such that the first set of meta information and a second set of meta information is appended to a network address of a media file identified in the secondary playlist file. Alternatively, the other response includes a second cookie including the first and second sets of meta information.

An application acceleration management computing device includes a processor and a memory coupled to the processor, wherein the memory comprises a cache and the processor is configured to be capable of executing programmed instructions comprising and stored in the memory to receive a first request from a client device, wherein the first request is for a master playlist file. The master playlist file is obtained and sent to the client device in a response to the first request. The master playlist file is modified prior to being sent such that a first set of meta information is appended to a network address of a secondary playlist file identified in the master playlist file. Alternatively, the response includes a first cookie including the first set of meta information. A second request is received from the client device, wherein the second request is for the secondary playlist file and includes the first set of meta information. The secondary playlist file is obtained and sent to the client device in another response to the second request. The secondary playlist file is modified prior to being sent such that the first set of meta information and a second set of meta information is appended to a network address of a media file identified in the secondary playlist file. Alternatively, the other response includes a second cookie including the first and second sets of meta information A non-transitory computer readable medium having stored thereon instructions for improved cache maintenance comprising executable code which when executed by a processor, causes the processor to perform steps including receiving a first request from a client device, wherein the first request is for a master playlist file. The master playlist file is obtained and sent to the client device in a response to the first request. The master playlist file is modified prior to being sent such that a first set of meta information is appended to a network address of a secondary playlist file identified in the master playlist file. Alternatively, the response includes a first cookie including the first set of meta information. A second request is received from the client device, wherein the second request is for the secondary playlist file and includes the first set of meta information. The secondary playlist file is obtained and sent to the client device in another response to the second request. The secondary playlist file is modified prior to being sent such that the first set of meta information and a second set of meta information is appended to a network address of a media file identified in the secondary playlist file.

This technology provides a number of advantages including more efficient and effective methods, non-transitory computer readable media, and devices for utilizing memory of AAM computing devices. With this technology, media content can be scored using meta information included in hierarchical playlist files without storing the meta information in memory subsequent to requests for the playlist files that are received prior to requests for the media content. The scoring facilitates relatively effective utilization and maintenance of the cache with respect to the media content, which results in relatively quick servicing of client device requests and an improved user experience. Additionally, the media content can be scored with reduced processor utilization and in less time since the meta information does not have to be retrieved from memory to generate the cache score, thereby resulting in improved functioning of the AAM computing device.

BRIEF DESCRIPTION OF THE DRAWINGS

FIG. 4 is a functional flow diagram of a method of processing a master playlist file;

FIG. 5 is a functional flow diagram of a method for processing a request for a secondary playlist file;

FIG. 6 is a functional flow diagram of a method of processing a secondary playlist file;

FIG. 7 is a functional flow diagram of a method for processing a request for a media file.

DETAILED DESCRIPTION

Figure 1:
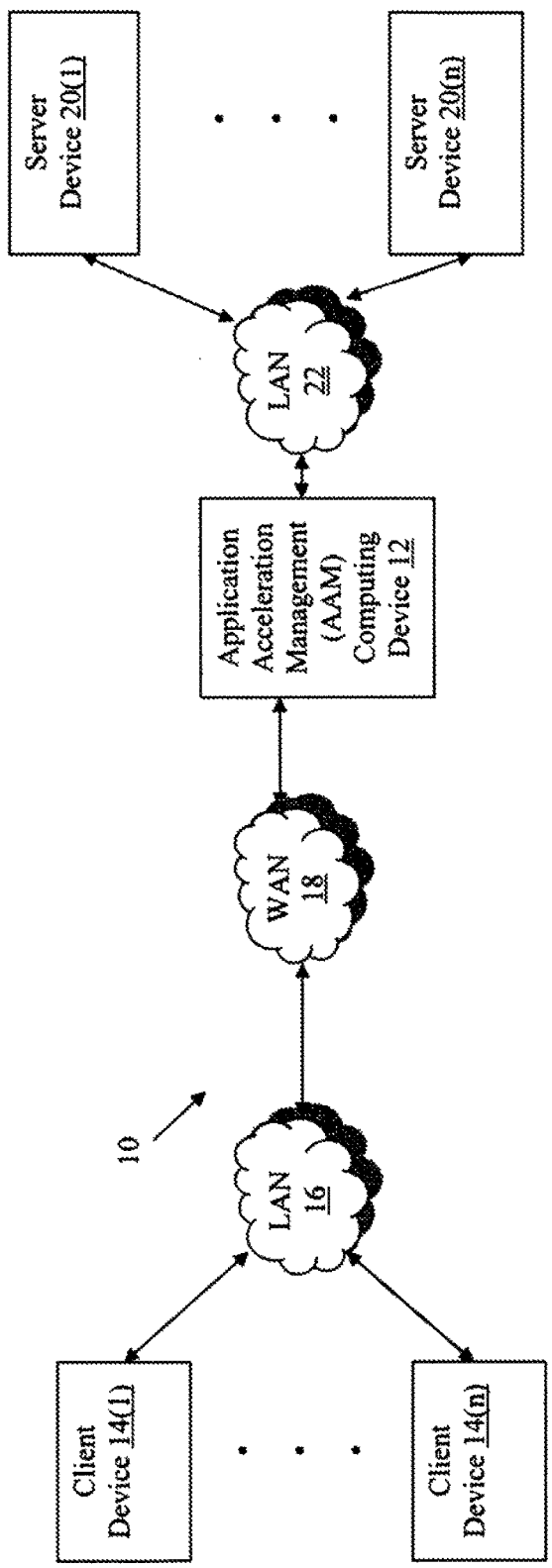
FIG. 1 is a block diagram of a network environment with an exemplary application acceleration management (AAM) computing device.

Referring to FIG. 1, a block diagram of an exemplary network environment 10 including an exemplary AAM computing device 12 is illustrated. In this example, the AAM computing device 12 is coupled to a plurality of client devices 14(1)-14(n) through a local area network (LAN) 16 and a wide area network (WAN) 18 and a plurality of server devices 20(1)-20(n) through another LAN 22, although the AAM computing device 12, client devices 141(1)-14(n), and server devices 20(1)-20(n) may be coupled together via other topologies. The network environment 10 may include other network devices such as one or more routers and/or switches, for example. This technology provides a number of advantages including methods, non-transitory computer readable media, and devices that facilitate improved maintenance of media content stored in a cache.

Figure 2:
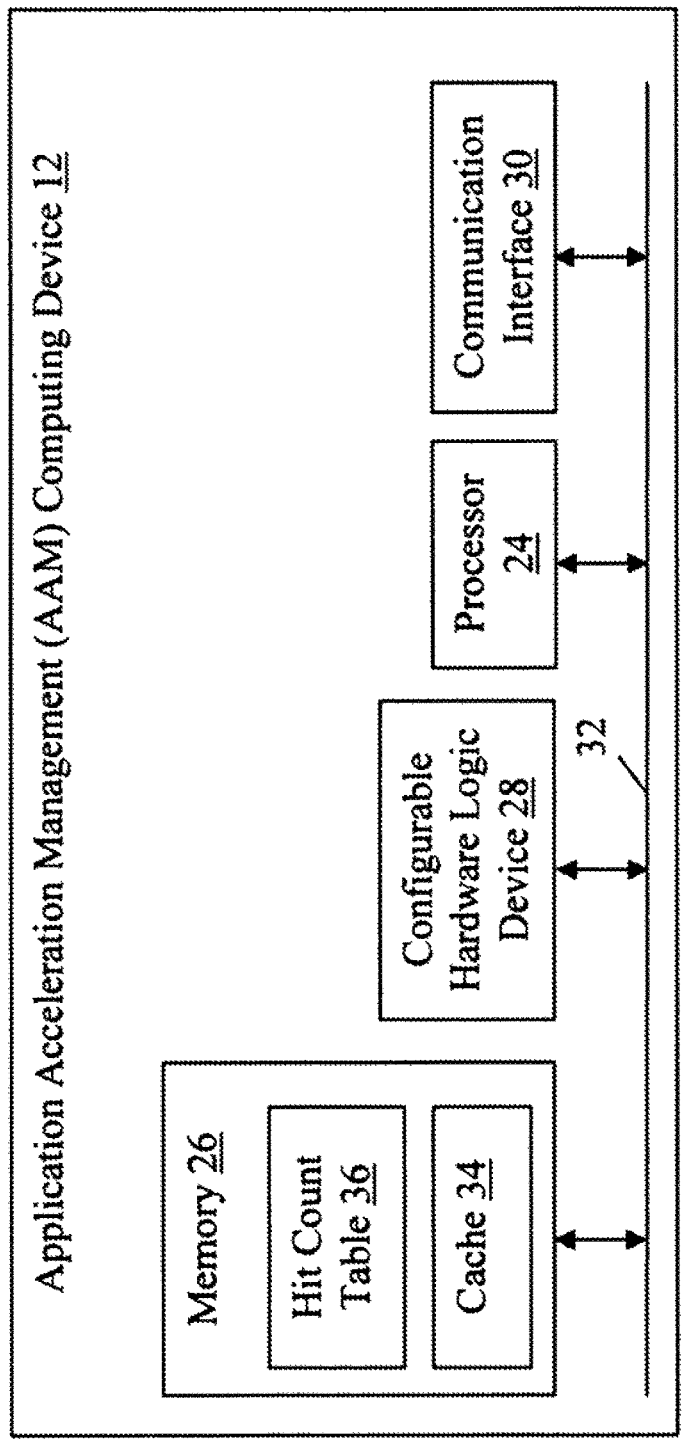
FIG. 2 is a block diagram of the exemplary AAM computing device illustrated in FIG. 1.

Referring to FIGS. 1-2, the AAM computing device 12 may perform any number of functions in addition to maintaining a cache, such as optionally optimizing, securing, and/or load balancing the network traffic exchanged between the client devices 14(1)-14(n) and the server devices 20(1)-20(n), for example. The AAM computing device 12 includes a processor 24, a memory 26, optional configurable hardware logic device 28, and a communication interface 30 which are coupled together by a bus 32 or other communication link, although the AAM computing device 12 may include other types and numbers of elements in other configurations.

The processor 24 of the AAM computing device 12 may execute one or more programmed instructions for any number of the functions identified above and/or described herein for maintaining a cache and, optionally, managing network traffic and/or optimizing service of content requests, for example. The processor 24 of the AAM computing device 12 may include one or more central processing units and/or general purpose processors with one or more processing cores, for example, although other types and numbers of processing devices can also be used for the processor 24.

The memory 26 of the AAM computing device 12 stores these programmed instructions for one or more aspects of the present technology as described and illustrated herein, although some or all of the programmed instructions could be stored and executed elsewhere. A variety of different types of memory storage devices, such as a random access memory (RAM), a read only memory (ROM), hard disks, solid state drives, or other computer readable medium which is read from and written to by a magnetic, optical, or other reading and writing system that is coupled to the processor 24, can be used for the memory 26.

In this example, the memory 26 further includes a cache 34, which is used by the AAM computing device 12 to store content retrieved from the server devices 20(1)-20(n). Optionally, the cache 34 includes relatively high performance memory capable of facilitating retrieval of content with reduced latency. With the cache 34, the AAM computing device 12 can service requests for some previously retrieved and stored content more quickly as compared to retrieving the content again from the server devices 20(1)-20(n). In this example, the memory 26 further includes an optional hit count table 36. The hit count table 36 stores indication of media content as associated with hit counts representing the number of times the media content has been requested in a prior time period of a predetermined size. Accordingly, the hit count corresponds with a popularity of a media file and can be used as an optional consideration, in addition to the cache score, when determining whether a media file should be cached.

The optional configurable hardware logic device 28 of the AAM computing device 12 may include specialized hardware configured to implement one or more steps of this technology as illustrated and described with reference to the examples herein. By way of example only, the optional configurable logic device 28 may comprise one or more of field programmable gate arrays (FPGAs), field programmable logic devices (FPLDs), application specific integrated circuits (ASICs) and/or programmable logic units (PLUs), for example, although other types of configurable hardware logic devices can also be used.

The communication interface 30 operatively couples and communicates between the AAM computing device 12, client devices 14(1)-14(n), and server devices 20(1)-20(n), which are all coupled together by the LANs 16 and 22 and the WAN 18, although other types and numbers of communication networks or systems with other types and numbers of connections and configurations to other devices and elements. By way of example only, the LANs 16 and 22 and the WAN 18 can use TCP/IP over Ethernet and industry-standard protocols, including NFS, CIFS, SOAP, XML, LDAP, and SNMP, although other types and numbers of communication networks, can be used.

The LANs 16 and 22 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The WAN 18 may comprise any wide area network (e.g., Internet), although any other type of traffic network topology may be used.

Each of the client devices 14(1)-14(n) and server devices 20(1)-20(n) includes a processor, a memory, and a communication interface, which are coupled together by a bus or other link, although other numbers and types of network devices could be used. Each of the client devices 14(1)-14(n) may further include an input device and a display device and may run interface applications, such as Web browsers or video player applications or plug-ins, that may provide an interface to make requests for and receive content hosted by the server devices 20(1)-20(n) via the LANs 16 and 22 and/or the WAN 18.

The server devices 20(1)-20(n) may provide media content or other network resources in response to requests directed toward applications hosted by the server devices 20(1)-20(n) from the client devices 14(1)-14(n) via the LANs 16 and 22 and/or the WAN 18 according to the HTTP-based application RFC protocol or the CIFS or NFS protocol, for example. The server devices 20(1)-20(n) may be hardware or software or may represent a system with multiple server devices in a server device pool, which may include internal or external networks. Various network processing applications, such as CIFS applications, NFS applications, HTTP Web Server device applications, and/or FTP applications, may be operating on the server devices 20(1)-20(n) and transmitting data (e.g., media content, video segments, files, and/or web pages) in response to requests from the client devices 14(1)-14(n).

Although the exemplary network environment 10 with the AAM computing device 12, client devices 14(1)-14(n), server devices 20(1)-20(n), LANs 16 and 22, and WAN 18 are described and illustrated herein, other types and numbers of systems, devices, components, and elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

Figure 3:
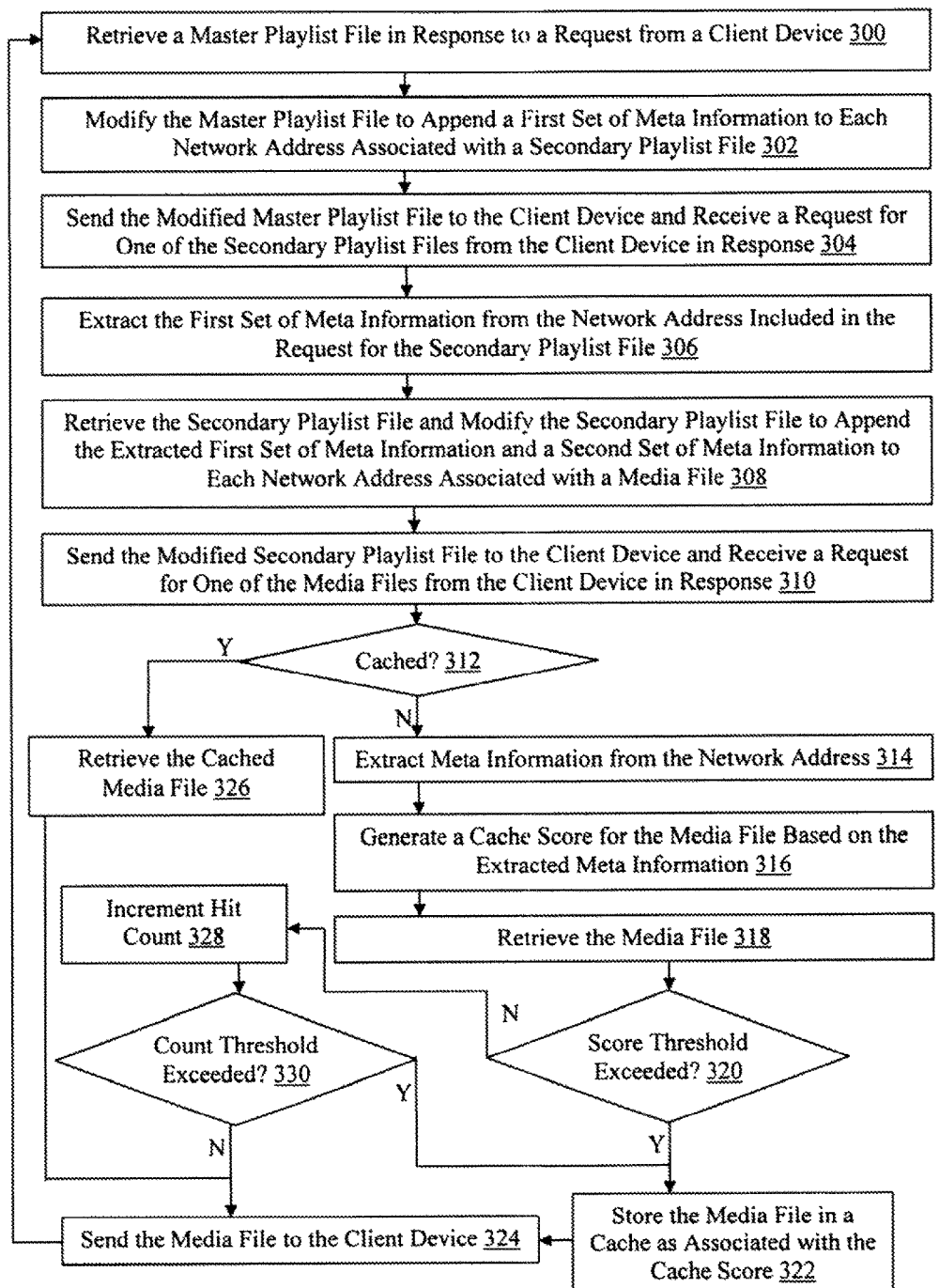
FIG. 3 is a flowchart of an exemplary method for improved cache maintenance using meta information appended to network addresses included in playlist files.

An example of a method for improved cache maintenance will now be described with reference to FIGS. 1-8. Referring more specifically to FIG. 3, an example of a method for improved cache maintenance using meta information appended to network addresses included in playlist files is illustrated. In step 300 in this example, the AAM computing device 12 receives a request from one of the client devices 14(1)-14(n) for a master playlist file and retrieves the master playlist file from one of the server devices 20(1)-20(n). In this example, the one of the client devices 14(1)-14(n) can be executing a video player application or web browser plug-in, for example, which causes the one of the client devices 14(1)-14(n) to send a request for the master playlist file required to render a video on the one of the client devices 14(1)-14(n).

In step 302, the AAM computing device 12 modifies the master playlist file to append a first set of meta information to each network address included in the master playlist file. Each of the network addresses of the master playlist file is associated with a respective secondary playlist file in this example. The master playlist file is a first file in a hierarchy of files that the application executing on the one of the client devices 14(1)-14(n) requires in order to render a video requested by the user of the one of the client devices 14(1)-14(n), as described and illustrated in more detail later. In this example, the first set of meta information includes a bit rate although the first set of meta information can include information regarding a codec required to encode and decode media files associated with the requested video, as well as other information.

Referring more specifically to FIG. 4, a functional flow diagram of a method of processing a master playlist file 400 is illustrated. In this example, the master playlist file 400 includes a network address for first and second secondary playlist files, which are each associated with a different bandwidth or bit rate (64000 and 256000, respectively, in this example), although any bit rate and any number of network addresses and secondary playlist files can be used.

The modified master playlist file 402 in this example includes the first network address associated with the first secondary playlist file appended with "?vo=64000!", which includes the "64000" bit rate corresponding to the first secondary playlist file, and a second network address associated with a second secondary playlist file appended with "?vo=256000!", which includes the "256000" bit rate corresponding to the second secondary playlist file. Optionally, the appended first set of meta information including the respective bit rates in this example can be encrypted, as illustrated with reference to the encrypted modified master playlist file 404. Also optionally, the network addresses with the appended first set of meta information can further be appended with a signature to prevent manipulation of the appended meta information.

Referring back to FIG. 3, in step 304, the AAM computing device 12 sends the modified master playlist file 402 or 404 to the one of the client devices 14(1)-14(n) and receives a request for one of the secondary playlist files from the one of the client devices 14(1)-14(n) in response. Accordingly, the application executing on the one of the client devices 14(1)-14(n) can determine which bit rate is currently most appropriate, or will result in the best experience for the user, for the requested video. Any number of factors can be used by the one of the client devices 14(1)-14(n) to determine which secondary playlist file to request, such as network connection speed for example.

In step 306, the AAM computing device 12 extracts the first set of meta information from the network address included in the request for the one of the secondary playlist files. The network address for the one of the secondary playlist files includes the first set of meta information because the one of the client devices used the network address included in the modified master playlist file 402 or 404, sent to the one of the client devices 14(1)-14(n) in step 304, in order to request the one of the secondary playlist files. Optionally, the appended first set of meta information can be prefixed by a reference character (e.g., "?") in order to distinguish the appended portion of the network address.

Accordingly, in step 306, and in step 314 as described and illustrated in more detail later, meta information previously appended to a network address is advantageously returned even if the one of the client devices 14(1)-14(n) has been set by a user to not accept cookies. Additionally, the meta information appended in steps 306 and 314 in this example is advantageously compatible and can co-exist with any URL query string added by another proxy or intermediary network device or one of the server devices 20(1)-20(n).

Referring more specifically to FIG. 5, a functional flow diagram of a method for processing a request for a secondary playlist file is illustrated. In this example, the network address 500 of the request received from the one of the client devices 14(1)-14(n) for the first secondary playlist file includes the first set of meta information, as included in the modified master playlist file 404. In this example, the appended first set of meta information is optionally encrypted, as described and illustrated earlier with reference to FIG. 4. Accordingly, in this example, the appended encrypted first set of meta information is extracted and then decrypted by the AAM computing device 12 in order to obtain the first set of meta information (the "64000" bit rate in this example).

Referring back to FIG. 3, in step 308, the AAM computing device 12 retrieves the one of the secondary playlist files, using the network address 500 of the request received in step 306, from one of the server devices 20(1)-20(n). Since the first set of meta information was extracted off in step 306, the one of the server devices 20(1)-20(n) will not see that information as part of the request for the one of the secondary playlist files. The AAM computing device 12 then modifies the one of the secondary playlist files to append the first set of meta information extracted in step 306 and a second set of meta information to each network address included in the one of the secondary playlist files. In this example, the network addresses included in the one of the secondary playlist files are each associated with one of a plurality of media files, which each correspond to a segment of the requested video, although the network addresses included in the one of the secondary playlist files can each be associated with an additional playlist file instead of a media files in other examples.

Accordingly, the second set of meta information in this example includes a number of the segment, duration of the segment, and/or relative distance of the segment with respect to the beginning of the video (e.g., the segment number multiplied by the duration), although other information can also be included in the second set of meta information. Optionally, the various portions of the appended first and second sets of meta information can be separated by a reference character (e.g., "!") in order to distinguish the various portions of the first and second sets of meta information.

Referring more specifically to FIG. 6, a functional flow diagram of a method of processing a secondary playlist file 600 is illustrated. In this example, the first secondary playlist file 600 includes two network addresses associated with first and second media files, although any number of network addresses and media files can be identified in the first secondary playlist file 600. In this example, the second set of meta information includes relative distance and duration of video segments corresponding to the media files, although other meta information can also be used, as described and illustrated earlier.

Accordingly, the modified first secondary playlist file 602 in this example includes the first network address associated with the first media file appended with "?vo=1!10!64000!", which includes the "1" segment number and "10" duration of the second set of meta information and "64000" bit rate of the first set of meta information. Additionally, the second network address associated with the second media file is appended with "?vo=2!10!64000!", which includes the "2" segment number and "10" duration of the second set of meta information and "64000" bit rate of the first set of meta information. Optionally, the appended first and second sets of meta information can be encrypted as illustrated in FIG. 6 with reference to the encrypted modified first secondary playlist file 604. Also optionally, the network addresses with the appended first and second sets of meta information can further be appended with a signature to prevent manipulation of the appended meta information.

Referring back to FIG. 3, in step 310, the AAM computing device 12 sends the modified secondary playlist file 602 or 604 to the one of the client devices 14(1)-14(n) and receives a request for one of the media files from the one of the client devices 14(1)-14(n) in response. Generally, the request received in step 310 will include a network address corresponding to a first media file, or a media file corresponding to the first segment number in examples in which the media files correspond to video segments, although the request can be for any of the media files. Accordingly, the application executing on the one of the client devices 14(1)-14(n) determines which media file to request in response to receiving the modified secondary playlist file 602 or 604.

In step 312, the AAM computing device 12 determines whether the requested one of the media files is stored in the cache 34 of the AAM computing device 12. Although not illustrated in FIG. 3, in other examples, the AAM computing device 12 can optionally store one or more of the master playlist file 400, modified master playlist file 402 or 404, one of the secondary playlist files 600, and/or modified secondary playlist files 602 or 604 in the cache 34, in addition to the one of the media files, as described and illustrated later, and retrieve one or more of those files from the cache 34 when requested by one of the client devices 14(1)-14(n). If the AAM computing device 12 determines that the requested one of the media files is not stored in the cache 34, then the No branch is taken to step 314.

In step 314, the AAM computing device 12 extracts the first and second sets of meta information from the network address included in the request for the one of the media files. The network address for the one of the media files includes the first and second sets of meta information because the one of the client devices 14(1)-14(n) used the network address included in the modified secondary playlist file 602 or 604, to which the first and second sets of meta information were appended in step 308, in the request for the one of the media files received in step 310. Optionally, the appended first and second sets of meta information can be prefixed by a reference character (e.g., "?") in order to distinguish the appended portion of the network address, as described and illustrated in more detail earlier.

Referring more specifically to FIG. 7, a functional flow diagram of a method for processing a request for a media file is illustrated. In this example, the network address 700 of the request received from the one of the client devices 14(1)-14(n) is for the first media file and includes the first and second sets of meta information, as appended to the network address of the first media file in the modified first secondary playlist file 604. In this example, the appended first and second sets of meta information are optionally encrypted, as described and illustrated earlier with reference to FIG. 6. Accordingly, in this example, the appended encrypted first and second sets of meta information are extracted and then decrypted by the AAM computing device 12 in order to obtain the first and second sets of meta information (the "64000" bit rate, "1" segment number, and "10" duration in this example).

Referring back to FIG. 3, in step 316 the AAM computing device 12 generates a cache score for the one of the media files based on the first and second sets of meta information extracted in step 314. The cache score can be generated based on any portion of the first and second sets of meta information, as well as any other additional information. Accordingly, in this example, the cache score can be advantageously generated based on meta information included in a master playlist file 400 and a secondary playlist file 600 without storing the meta information in the memory 26 of the AAM computing device 12.

In step 318, the AAM computing device 12 retrieves the one of the media files, identified in the request received in step 310, from one of the server devices 20(1)-20(n). Since the first and second sets of meta information was extracted off in step 314, the one of the server devices 20(1)-20(n) will not see that information as part of the request for the one of the media files sent to the one of the server devices 20(1)-20(n). In step 320, the AAM computing device 12 determines whether the cache score generated in step 316 exceeds a specified threshold. The threshold can be specified by an administrator or can be dynamically determined at run time by the AAM computing device 12 based on any number of factors. If the AAM computing device 12 determines that the generated cache score exceeds the specified threshold, then the Yes branch is taken to step 322.

In step 322, the AAM computing device 12 stores the one of the media files in the cache 34 as associated with the cache score generated in step 316. The cache score can subsequently be used by the AAM computing device 12 to determine whether the one of the media files or other content should be removed from the cache due to space constraints or for any other reason. Optionally, the AAM computing device 12 stores the one of the media files in a level of the cache 34 determined based on the generated cache score.

In step 324, the AAM computing device 12 sends the one of the media files to the requesting one of the client devices 14(1)-14(n). Subsequent to sending the one of the media files, or during any of the steps illustrated in FIG. 3, the AAM computing device 12 proceeds to retrieve another master playlist file in response to a request for the other master playlist file received from the same or a different one of the client devices 14(1)-14(n) in step 300, as described and illustrated earlier.

Referring back to step 312, if the AAM computing device 12 determines that the requested one of the media files is stored in the cache 34, then the Yes branch is taken to step 326. The one of the media files can be stored in the cache 34 as described and illustrated earlier with reference to step 322, for example. In step 326, the AAM computing device 12 retrieves the one of the media files from the cache 34 and optionally increments the hit count for the one of the media files in the hit count table 36. The AAM computing device 12 then proceeds to step 324 and sends the one of the media files to the requesting one of the client devices 14(1)-14(n), as described and illustrated earlier.

Referring back to step 320, if the AAM computing device 12 determines that the cache score generated in step 316 does not exceed the specified threshold, then the No branch is taken to step 328. In step 328, the AAM computing device 12 increments a hit count for the media as stored in the hit count table 36 of the AAM computing device 12. Accordingly, the hit count in this example corresponds with a popularity of the media file and can be used to determine whether the media file should be cached in addition to or in place of the comparison to the specified threshold in step 320.

Accordingly, in examples in which the optional hit count table 36 is used, in step 330, the AAM computing device 12 determines whether the hit count for the one of the media files has exceeded a threshold predetermined level. If the AAM computing device 12 determines that the hit count for the one of the media files has exceeded the threshold level, then the Yes branch is taken to step 322 and the media file is stored in the cache 34 associated with the cache score generated in step 316, as described and illustrated earlier. However, if the AAM computing device 12 determines in step 330 that the hit count for the media file does not exceed the threshold, then the No branch is taken to step 324 and the media file is sent to the requesting one of the client devices 14(1)-14(n) without being cached. Optionally, the hit count table 36 can be swept periodically to remove aged entries or decrement hit counts to reflect hits that occurred earlier than a specified time period, although other methods of managing the optional hit count table 36 can also be used.

Figure 8:
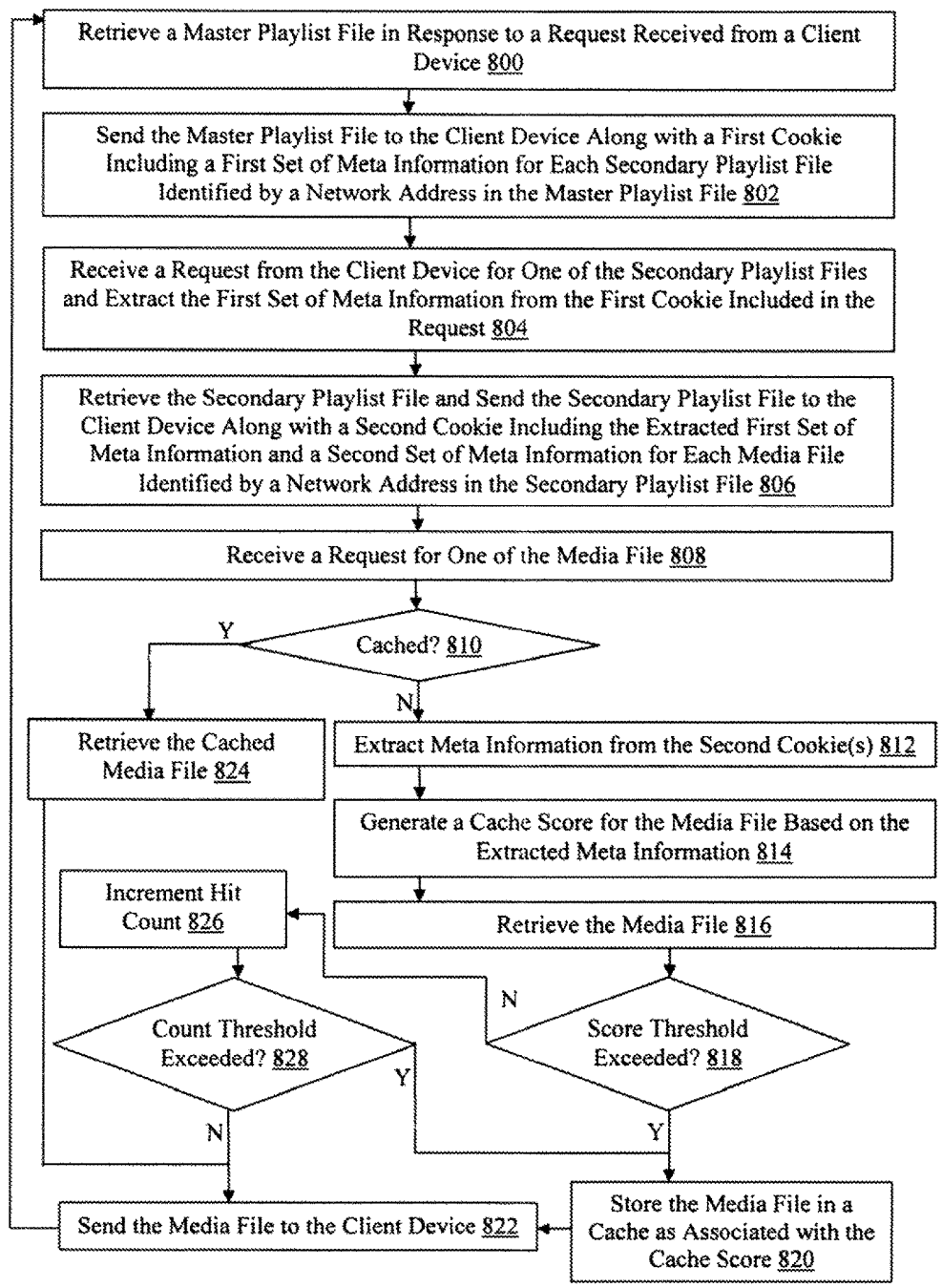
FIG. 8 is a flowchart of an exemplary method for improved cache maintenance using cookies.

Referring more specifically to FIG. 8, an example of a method for improved cache maintenance using cookies is illustrated. In step 800 in this example, the AAM computing device 12 receives a master playlist file in response to a request received from one of the client devices 14(1)-14(n) for the master playlist file, as described and illustrated earlier with reference to step 300 of FIG. 3.

In step 802, the AAM computing device 12 sends the master playlist file to the one of the client devices 14(1)-14(n) along with a first cookie including a first set of meta information for each of a plurality of secondary playlist files identified by a network address in the master playlist file. The first set of meta information can be the same or different meta information than that described and illustrated earlier with reference to the step 302 of FIG. 3. Optionally, one or more cookies can be included for one or more secondary playlist files. However, the one of the client devices 14(1)-

14(*n*) in this example must be configured to accept cookies in order for effective operation of the method described and illustrated with reference to FIG. 8.

Accordingly, the first cookie includes the first set of meta information associated with an indication of the associated one of the secondary playlist files. The first cookie can be inserted by the AAM computing device 12 in an HTTP response sending the master playlist file to the one of the client devices 14(1)-14(*n*). Optionally the first cookie, or at least the first set of meta information included in the first cookie, is encrypted prior to being sent along with the master playlist file.

In step 804, the AAM computing device 12 receives a request from the one of the client devices 14(1)-14(*n*) for one of the secondary playlist files and extracts the first set of meta information from the first cookie included in the request. Accordingly, the AAM computing device 12 identifies the one of the secondary playlist files based on the network address included in the request and extracts the first set of meta information corresponding to the one of the secondary playlist files from the first cookie based on a match of the indication of the one of the secondary playlist files included in the first cookie in step 802. Optionally, the AAM computing device 12 extracts the first cookie and decrypts the first set of meta information included therein in order to obtain the first set of meta information.

In step 806, the AAM computing device 12 retrieves the one of the secondary playlist files from one of the server devices 20(1)-20(*n*) and sends the one of the secondary playlist files to the one of the client devices 14(1)-14(*n*) along with at least one second cookie including a second set of meta information for each of a plurality of media files identified by a network address in the one of the secondary playlist files. The second set of meta information can be the same or different meta information than that described and illustrated earlier with reference to step 308 of FIG. 3. The second cookie can also include the first set of meta information extracted in step 804 and a second set of meta information. Optionally one or more cookies can be included for one or more media files identified by a network address in the one of the secondary playlist files.

Accordingly, the second cookie includes the first and second sets of meta information associated with an indication of the associated one of the media files. The second cookie can be inserted by the AAM computing device 12 in an HTTP response sending the one of the secondary playlist files to the one of the client devices 14(1)-14(*n*). Optionally the second cookie, or at least the first and second sets of meta information included in the second cookie, is encrypted prior to being sent along with the secondary playlist file.

In step 808, the AAM computing device 12 receives a request for one of the media files. The request for the one of the media files includes the second cookie. In step 810, the AAM computing device 12 determines whether the one of the media files is stored in the cache 34 of the AAM computing device 12, as described and illustrated earlier. If the AAM computing device 12 determines that the one of the media files is not stored in the cache 34, then the No branch is taken to step 812.

In step 812, the AAM computing device 12 extracts the first and second sets of meta information from the second cookie included in the request for the one of the media files received in step 808. The AAM computing device 12 identifies the one of the media files based on the network address included in the request and extracts the first and second sets of meta information corresponding to the one of the media files from the second cookie based on a match of the indication of the one of the media files included in the second cookie in step 806. Optionally, the AAM computing device 12 extracts the second cookie and decrypts the first and second sets of meta information included therein in order to obtain the first and second sets of meta information.

In step 814, the AAM computing device 12 generates a cache score for the one of the media files based on the first and second sets of meta information extracted in step 812, as described and illustrated earlier with reference to step 316 of FIG. 3. Accordingly, in this example, the cache score can be advantageously generated based on meta information included in a master playlist file and a secondary playlist file without storing the meta information in the memory 26 of the AAM computing device 12. Subsequent to generating the cache score, the AAM computing device 12 retrieves the media file, determines whether to store the media file in the cache 34 based on the cache score or the hit count, and sends the media file to the requesting one of the client devices 14(1)-14(*n*) in steps 816-822 and 826-828, as described and illustrated earlier with reference to steps 318-324 and 328-330 of FIG. 3.

Referring back to step 810, if the AAM computing device 12 determines that the requested one of the media files is stored in the cache 34, then the Yes branch is taken to step 824. The one of the media files can be stored in the cache 34 as described and illustrated earlier with reference to step 820, for example. In step 824, the AAM computing device 12 retrieves the one of the media files from the cache 34 and optionally increments the hit count for the one of the media files in the hit count table 36, as described and illustrated earlier with reference to step 326 of FIG. 3. The AAM computing device 12 then proceeds to send the one of the media files to the requesting one of the client devices 14(1)-14(*n*) in step 822, as described and illustrated earlier.

With this technology, a cache score can advantageously be generated for media based on meta information, included in hierarchical playlists associated with a requested media file, without utilizing the memory of an AAM computing device. Accordingly, an increased amount of memory of the AAM computing device can be allocated to other tasks, such as optimizing and accelerating network traffic for client devices, resulting in an improved user experience. By improving the memory utilization, and using fewer processor cycles to store and retrieve meta information required to generate cache scores for media content, the functioning of AAM computing devices is improved with this technology.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for improved cache maintenance implemented by a network traffic management system comprising one or more application acceleration management computing devices, the method comprising:

receiving a first request from a client device, wherein the first request is for a master playlist file;

obtaining the master playlist file and sending the master playlist file to the client device in a response to the first request, wherein the master playlist file is modified prior to being sent such that a first set of meta information is appended to a network address of a secondary playlist file identified in the master playlist file or the response includes a first cookie including the first set of meta information;

receiving a second request from the client device, wherein the second request is for the secondary playlist file and includes the first set of meta information;

obtaining the secondary playlist file and sending the secondary playlist file to the client device in another response to the second request, wherein the secondary playlist file is modified prior to being sent such that the first set of meta information and a second set of meta information is appended to a network address of a media file identified in the secondary playlist file or the other response includes a second cookie including the first and second sets of meta information; and receiving a third request from the client device, wherein the third request is for the media file and includes the first and second sets of meta information; and generating a cache score for the media file based on the first and second sets of meta information included in the third request, obtaining the media file, storing the media file in a cache as associated with the cache score, and sending the media file to the client device in response to the third request.

2. The method of claim 1, wherein the first set of meta information comprises an indication of at least one of a bit rate, a bandwidth, or a codec and the second set of meta information comprises an indication of at least one of a relative distance or a duration.

3. The method of claim 1, further comprising: encrypting the first set of meta information prior to sending the response and the first and second sets of meta information prior to sending the second response; and
   decrypting the first set of meta information extracted from the second request and the first and second sets of meta information extracted from the third request.

4. The method of claim 1, further comprising: appending a first signature to the appended first set of meta information prior to sending the response; and
   appending a second signature to the appended first and second sets of meta information prior to sending the other response.

5. The method of claim 1, further comprising:
   determining when the cache score exceeds a specified threshold;
   only storing the media file in the cache as associated with the cache score when the cache score is determined to exceed the specified threshold; and
   incrementing a hit count corresponding to the media file when the cache score is determined not to exceed the specified threshold.

6. The method of claim 1, wherein the storing further comprises storing the media file as associated with the cache score in a level of the cache determined based on the cache score.

7. An application acceleration management computing device, comprising memory comprising a cache and programmed instructions stored thereon and one or more processors coupled to the memory and configured to be capable of executing the stored programmed instructions to:

receive a first request from a client device, wherein the first request is for a master playlist file;

obtain the master playlist file and sending the master playlist file to the client device in a response to the first request, wherein the master playlist file is modified prior to being sent such that a first set of meta information is appended to a network address of a secondary playlist file identified in the master playlist file or the response includes a first cookie including the first set of meta information;

receive a second request from the client device, wherein the second request is for the secondary playlist file and includes the first set of meta information;

obtain the secondary playlist file and sending the secondary playlist file to the client device in another response to the second request, wherein the secondary playlist file is modified prior to being sent such that the first set of meta information and a second set of meta information is appended to a network address of a media file identified in the secondary playlist file or the other response includes a second cookie including the first and second sets of meta information; and receive a third request from the client device, wherein the third request is for the media file and includes the first and second sets of meta information; and generate a cache score for the media file based on the first and second sets of meta information included in the third request, obtain the media file, store the media file in the cache as associated with the cache score, and send the media file to the client device in response to the third request.

8. The application acceleration management computing device of claim 7, wherein the first set of meta information comprises an indication of at least one of a bit rate, a bandwidth, or a codec and the second set of meta information comprises an indication of at least one of a relative distance or a duration.

9. The application acceleration management computing device of claim 7, wherein the one or more processors are further configured to be capable of executing the stored programmed instructions to:
   encrypt the first set of meta information prior to sending the response and the first and second sets of meta information prior to sending the second response; and
   decrypt the first set of meta information extracted from the second request and the first and second sets of meta information extracted from the third request.

10. The application acceleration management computing device of claim 7, wherein the one or more processors are further configured to be capable of executing the stored programmed instructions to:
    append a first signature to the appended first set of meta information prior to sending the response; and
    append a second signature to the appended first and second sets of meta information prior to sending the other response.

11. The application acceleration management computing device of claim 7, wherein the one or more processors are further configured to be capable of executing the stored programmed instructions to:
    determine when the cache score exceeds a specified threshold;
    only store the media file in the cache as associated with the cache score when the cache score is determined to exceed the specified threshold; and increment a hit count corresponding to the media file when the cache score is determined not to exceed the specified threshold.

12. The application acceleration management computing device of claim 7, wherein the one or more processors are further configured to be capable of executing the stored programmed instructions to store the media file as associated with the cache score in a level of the cache determined based on the cache score.

13. A non-transitory computer readable medium having stored thereon instructions for improved cache maintenance comprising executable code which when executed by one or more processors, causes the one or more processors to:
  receive a first request from a client device, wherein the first request is for a master playlist file;
  obtain the master playlist file and sending the master playlist file to the client device in a response to the first request, wherein the master playlist file is modified prior to being sent such that a first set of meta information is appended to a network address of a secondary playlist file identified in the master playlist file or the response includes a first cookie including the first set of meta information;
  receive a second request from the client device, wherein the second request is for the secondary playlist file and includes the first set of meta information; and
  obtain the secondary playlist file and sending the secondary playlist file to the client device in another response to the second request, wherein the secondary playlist file is modified prior to being sent such that the first set of meta information and a second set of meta information is appended to a network address of a media file identified in the secondary playlist file or the other response includes a second cookie including the first and second sets of meta information; and
  receive a third request from the client device, wherein the third request is for the media file and includes the first and second sets of meta information; and
  generate a cache score for the media file based on the first and second sets of meta information included in the third request, obtain the media file, store the media file in a cache as associated with the cache score, and send the media file to the client device in response to the third request.

14. The non-transitory computer readable medium of claim 13, wherein the first set of meta information comprises an indication of at least one of a bit rate, a bandwidth, or a codec and the second set of meta information comprises an indication of at least one of a relative distance or a duration.

15. The non-transitory computer readable medium of claim 13, wherein the executable code when executed by the one or more processors further causes the one or more processors to:
  encrypt the first set of meta information prior to sending the response and the first and second sets of meta information prior to sending the second response; and
  decrypt the first set of meta information extracted from the second request and the first and second sets of meta information extracted from the third request.

16. The non-transitory computer readable medium of claim 13, wherein the executable code when executed by the one or more processors further causes the one or more processors to:
  append a first signature to the appended first set of meta information prior to sending the response; and
  append a second signature to the appended first and second sets of meta information prior to sending the other response.

17. The non-transitory computer readable medium of claim 13, wherein the executable code when executed by the one or more processors further causes the one or more processors to:
  determine when the cache score exceeds a specified threshold;
  only store the media file in the cache as associated with the cache score when the cache score is determined to exceed the specified threshold; and
  increment a hit count corresponding to the media file when the cache score is determined not to exceed the specified threshold.

18. The non-transitory computer readable medium of claim 13, wherein the executable code when executed by the one or more processors further causes the one or more processors to store the media file as associated with the cache score in a level of the cache determined based on the cache score.

* * * * *